3,053,740
**BIOLOGICAL CONVERSION OF ANHYDROTETRA-
CYCLINES TO TETRACYCLINES**
Philip Andrew Miller, Valley Cottage, and Jerry Robert
Daniel McCormick, New City, N.Y., assignors to American Cyanamid Company, New York, N.Y., a corporation of Maine
No Drawing. Filed Aug. 25, 1960, Ser. No. 51,775
9 Claims. (Cl. 195—80)

This invention relates to a new process for producing tetracyclines and, more particularly, is concerned with a novel process for biologically transforming anhydrotetracyclines to the corresponding tetracyclines.

The tetracyclines are disclosed in U.S. Patent 2,482,055 to Duggar, U.S. Patent 2,734,018 to Minieri et al., U.S. Patent 2,878,289 to McCormick et al., and U.S. Patent 2,516,080 to Sobin et al. They have been produced by aerobically fermenting an aqueous nutrient medium with various strains of the genus Streptomyces, the morphological and cultural characteristics of which are adequately described in the aforesaid U.S. patents.

The anhydrotetracyclines, the starting materials for the novel process of the present invention, are well known compounds and may be readily prepared by the dehydration of the corresponding tetracycline with a strong mineral acid. Anhydrochlortetracycline is described in U.S. Patent 2,744,931 to Broschard et al., and anhydrotetracycline is described in U.S. Patent 2,744,932 to Waller et al. Anhydro-4-epi-tetracycline, anhydro-5-hydroxytetracycline, anhydro-6-demethylchlortetracycline, and 10-benzenesulfonyl-anhydro-5-hydroxytetracyclinonitrile have been disclosed in the Journal of the American Chemical Society 79, 2849 (1957); 74, 4976 (1952); 79, 4563 (1957); and 74, 4976 (1952), respectively. In addition, the synthesis of dedimethylamino-12α-deoxy-6-demethylanhydrochlortetracycline has ben described by J. H. Boothe et al., J.A.C.S. 81, 1006 (1959). The anhydrotetracyclines exhibit antimicrobial activity particularly against certain strains of bacteria which are resistant to the tetracyclines.

Our invention is based upon the discovery that it is possible to effect the biological transformation of anhydrotetracyclines to the corresponding tetracyclines; that is, the biological hydration at the 5a-6 bond of the anhydrotetracyclines. This transformation is accomplished by adding an anhydrotetracycline compound to a fermentation medium inoculated with a strain of a species of the genus Streptomyces such as, for example S. aureofaciens ATCC No. 10,762, S. aureofaciens ATCC No. 12,551, S. aureofaciens ATCC No. 13,192, S. rimosus ATCC No. 10,970, and S. viridifaciens ATCC No. 11,989; viable cultures of which have been deposited with the American Type Culture Collection (ATCC) in Washington, D.C. After fermenting for a suitable time, for example, from 12 to 96 hours, it is found that the conversion of the anhydrotetracycline to the corresponding tetracycline is from about 25% to about 75% complete.

It is most surprising that the anhydrotetracyclines can serve as substrates which can be acted upon by the microorganism so as to transform the anhydrotetracycline compounds to the corresponding tetracyclines. In the normal fermentation, the ingredients of the nutrient medium serve as the substrate from which the antibiotic is synthesized. It is unexpected to discover that a known stable chemical compound, especially one resulting from vigorous chemical degradation, may serve as the substrate for producing an entirely different tetracycline compound.

The conditions of the fermentation for the biological conversion of the anhydrotetracyclines to the corresponding tetracyclines are generally the same as set forth in the aforesaid U.S. patents to Duggar and to Minieri et al. and which, in turn, are generally the same as for the presently known methods for producing various tetracyclines by fermentation. That is, the fermentation medium contains the usual nutrients and mineral substances. Suitable nutrients include starch, dextrose, cane sugar, glucose, molasses, soybean meal, peanut meal, yeast, meat extracts, peptone, urea, corn steep liquor, distillers solubles, fish meal and other conventional substances. The inorganic salts include such things as calcium carbonate, ammonium sulfate, ammonium chloride, and salts of the various trace elements such as manganese, cobalt, zinc, copper, iron and the like.

The other general conditions of the fermentation, such as hydrogen ion concentration, temperature, time rate of aeration, preparation of the inoculum, sterilization, inoculation and the like are conventional and are similar to those for the production of chlortetracycline shown in U.S. Patent No. 2,482,055, to Duggar.

After the fermentation has been continued for the desired period of time and the transformation of the anhydrotetracycline compound to the corresponding tetracycline is substantially complete, the tetracycline compound may be isolated from the fermentation mash in any convenient manner such as are set forth in the aforementioned U.S. patents to Duggar and to Minieri et al.

The invention will be described in greater detail in conjunction with the following specific examples wherein the sterile inoculum medium has the following composition:

| | Grams |
|---|---|
| Corn steep liquor | 20 |
| Dextrin No. 162 | 30 |
| $(NH_4)_2SO_4$ | 2 |
| $CaCO_3$ | 7 |

Water to 1000 milliliters.

and the sterile fermentation medium has the following composition:

| | | |
|---|---|---|
| Corn steep liquor | grams | 27.5 |
| Starch | do | 55.0 |
| $(NH_4)_2SO_4$ | do | 5.0 |
| $CaCO_3$ | do | 9.0 |
| $MgCl_2$ | do | 2.0 |
| $NH_4 Cl$ | do | 1.5 |
| Trace elements solution [1] | milliliters | 10.0 |

Water to 1000 milliliters.

[1] Trace elements solution:

| | | |
|---|---|---|
| $FeSO_4 \cdot 7H_2O$ | grams | 12 |
| $ZnSO_4$ | do | 20 |
| $MnSO_4 \cdot H_2O$ | do | 1 |

Water to 1000 ml.
Adjust pH=1.3 with concentrated $H_2SO_4$.

EXAMPLE 1

*Conversion of Anhydrotetracycline to Tetracycline*

Spores of *Streptomyces aureofaciens* ATCC No. 10,762 were washed from a streaked agar slant with sterile distilled water and yielded a suspension containing $73 \times 10^6$ spores per milliliter. A 1.0 ml. aliquot of this suspension was added to 100 ml. of the sterile inoculum medium in a 500-ml. Erlenmeyer flask. The mixture was incubated at 26.5° C. for 24 hours on a reciprocating shaker operating at 116 oscillations per minute. A 1.0 ml. portion of this 24-hour inoculum was added to each of two 250-ml. Erlenmeyer flasks containing 25 ml. volumes of the sterile fermentation medium. The flasks and contents were incubated at 25° C. for 48 hours on a rotary shaker operating at 180 revolutions per minute. Upon completion of this 48-hour incubation period, 10 mg. of $C^{14}$-labeled anhydrotetracycline (300 disintegrations per minute per microgram of anhydrotetracycline)

was added as a fine powder to one of the two 250-ml. Erlenmeyer flasks containing the 48-hour fermentation mashes; the other flask and its contents being retained as a control. The two flasks were incubated for an additional 72 hours at 25° C. on a rotary shaker; making this a total incubation time of 120 hours. At this time, 3.0 ml. portions were removed from each of the two flasks before the mash assay was performed.

Mash assay for tetracycline, mcg./ml.
Control (no anhydrotetracycline added)_____ 50
Test (10 mg. anhydrotetracycline added)_____ 270

The 220 mcg./ml. difference between the control value of 50 mcg./ml. and the test value of 270 mcg./ml. is the amount of tetracycline derived from the conversion of the anhydrotetracycline which was added. This represents an overall conversion from anhydrotetracycline to tetracycline of 55 percent.

The 3.0 ml. portions of control and test 120-hour fermentation mashes, removed and saved before the mash assay was performed, were each diluted with 10 ml. of 0.2 N hydrochloric acid and the mycelium removed by filtration. Each filtrate was extracted by shaking with 1.5 ml. of parachlorophenol.

Ten microliters of each phenol phase were spotted on individual 1-inch wide by 22-inch long strips of Whatman No. 1 chromatograph paper which previously had been buffered by immersion in a solution of 0.3 M $NaH_2PO_4$ adjusted to pH 3.0 with phosphoric acid, then air dried. Subsequently the strips were subjected to descending development; using the organic phase of a n-butanol:0.3 M $NaH_2PO_4$::1:1 solvent system wherein the buffer was adjusted to pH 3.0 with phosphoric acid (system A).

Two 1-inch wide by 22-inch long strips of Whatman No. 1 chromatograph paper which previously had been buffered by immersion in a solution composed of equal volumes of 0.4 M $Na_2HPO_4$ and 4.5 percent citric acid, then air dried, were hung overnight in a chromatograph tank containing water on the floor of the tank and ethyl acetate in an open container on the bottom of the tank. About an hour before developing, a 10-microliter volume of the phenol phase of the extract of control filtrate was spotted on one strip and an equal volume of the phenol phase of the extract of test filtrate was spotted on the other strip. Subsequently, the strips were subjected to descending development; using the organic phase of an ethyl acetate:phosphate-citrate buffer::1:1 solvent system at pH 4.5 (system B). The phosphate-citrate buffer is composed of equal volumes of 0.4 M $Na_2HPO_4$ and 4.5 percent citric acid. Developed spots were detected by fuming the strips with ammonia and viewing under ultraviolet light.

The developed, air-dried strips were scanned for radioactivity by means of a Geiger-Müller counter. The appearance of zones of radioactivity on the test strips at $R_f$ 0.31 (system A) and at $R_f$ 0.41 (system B); corresponding to the $R_f$ values for tetracycline on the control strips, confirmed the conversion of anhydrotetracycline to tetracycline as previously demonstrated by the mash assay shown above. By measurement of radioactive peak areas, the extent of conversion of $C^{14}$-labeled anhydrotetracycline to $C^{14}$-labeled tetracycline was estimated at 50 percent.

EXAMPLE 2

Conversion of Anhydrotetracycline to Tetracycline

An aqueous suspension of S. rimosus ATCC No. 10,970 spores containing approximately $68 \times 10^6$ spores per milliliter, was prepared by washing a streaked agar slant with sterile distilled water. A 1.0 ml. of volume of this suspension was added to 100 ml. of the sterile inoculum medium in a 500-ml. Erlenmeyer flask. The inoculated material was incubated at 26.5° C. for 24 hours on a reciprocating shaker, then a 1.0 ml. portion of this 24-hour vegetative inoculum was removed and added to a 25-ml. portion of the sterile fermentation medium in a 250-ml. Erlenmeyer flask. The flask contents were incubated at 25° C. for 48 hours on a rotary shaker, then 3.0 ml. samples of the growing mash were transferred to two 20×150 mm. sterile shaker tubes. A 200 mcg. quantity of $C^{14}$-labeled anhydrotetracycline (1000 disintegrations per minute per microgram) in powder form was added to one tube; the other being retained as a control. The tubes were mounted on a rotary shaker and incubated at 25° C. for an additional 72 hours; making a total incubation period of 120 hours. Upon completion of this incubation period, the tubes were removed, the mash in each diluted with 10 ml. of 0.2 N hydrochloric acid and the mycelium removed by filtration. Each filtrate was extracted by shaking with 0.5 ml. of parachlorophenol.

Ten-microliter portions of each phenol phase were chromatographed according to systems A and B described in Example 1. The developed, air-dried chromatograms were examined visually, then scanned for radioactivity by means of a Geiger-Müller counter.

The appearance of zones of radioactivity having $R_f$ values of 0.31 (system A) and of 0.41 (system B); corresponding to the $R_f$ values for tetracycline on the control strips; confirmed the conversion of anhydrotetracycline to tetracycline. By measurement of radioactive peak areas, the extent of conversion of anhydrotetracycline to tetracycline was estimated at about 10 percent.

EXAMPLE 3

Conversion of Anhydrotetracycline to Tetracycline

A 1.0 ml. spore suspension of S. viridifaciens ATCC No. 11,989 containing $63 \times 10^6$ spores per milliliter, was added to 100 ml. of the sterile inoculum medium contained in a 500-ml. Erlenmeyer flask. This mixture was incubated at 26.5° C. for 24 hours on a reciprocating shaker operating at 116 oscillations per minute. At the termination of this incubation period, a 25 ml. portion of the sterile fermentation medium in a 250-ml. Erlenmeyer flask was seeded with a 1.0 ml. aliquot of this 24-hour vegetative inoculum. This seeded flask was incubated at 25° C. for 48 hours on a rotary shaker operating at 180 revolutions per minute. Upon completion of this 48-hour incubation period, 3.0 ml. aliquots of the growing mash were transferred to two 20×150 mm. sterile shaker tubes. A 200 mcg. quantity of $C^{14}$-labeled anhydrotetracycline (1000 disintegrations per minute per microgram) in powder form was added to one tube; the other being retained as a control. The tubes were mounted on a rotary shaker and incubated at 25° C. for an additional 72 hours; making a total incubation period of 120 hours. Upon completion of this incubation period, the tubes were removed, the mash in each diluted with 10 ml. of 0.2 N hydrochloric acid and the mycelium removed by filtration. Each filtrate was extracted by shaking with 0.5 ml. of parachlorophenol.

Ten-microliter portions of each phenol phase were chromatographed according to systems A and B described in Example 1. The developed, air-dried chromatograms were examined visually, then scanned for radioactivity by means of a Geiger-Müller counter.

The appearance of zones of radioactivity having $R_f$ values of 0.31 (system A) and of 0.41 (system B); corresponding to the $R_f$ values for tetracycline on the control strips; confirmed the conversion of anhydrotetracycline to tetracycline. By measurement of radioactive peak areas, the extent of conversion of anhydrotetracycline to tetracycline was estimated at about 30 percent.

EXAMPLE 4

Conversion of 7-Chloroanhydrotetracycline to 7-Chlorotetracycline

A 1.0 ml. spore suspension of S. aureofaciens ATCC

No. 10,762 containing 65×10⁶ spores per milliliter, was added to 100 ml. of the sterile inoculum medium contained in a 500-ml. Erlenmeyer flask. This mixture was incubated at 26.5° C. for 24 hours on a reciprocating shaker operating at 116 oscillations per minute.

Next, a 25 ml. portion of the sterile fermentation medium was placed in each of four 250-ml. Erlenmeyer flasks. An inhibitor of fermentative chlorination, 2(2-furyl)-5-mercapto-1,3,4-oxadiazole, was added; in the proportion of 7 mcg./ml. of fermentation medium, that is, a total of 175 mcg. to each of the four flasks. After being sterilized, cooled, and seeded with 1.0 ml. aliquots of the 24-hour inoculum described above, the four flasks were incubated at 25° C. for 48 hours on a rotary shaker operating at 180 revolutions per minute.

At the termination of this incubation period, 8.75 mg. of anhydrochlortetracycline was added to the contents of one flask; 12.5 mg. of $C^{14}$-labeled anhydrochlortetracycline (320 disintegrations per minute per microgram of anhydrochlortetracycline) was added to the contents of the second flask; 12.5 mg. of $Cl^{36}$-labeled anhydrochlortetracycline (50 disintegrations per minute per microgram of anhydrochlortetracycline) was added to the contents of the third flask; the fourth flask being retained as a control.

All four flasks were again incubated at 25° C. on a rotary shaker for an additional 72 hours; making a total incubation time of 120 hours. At this time, 3.0 ml. portions were removed from each of the two 25 ml., 120-hour fermentation mashes containing $C^{14}$-labeled anhydrochlortetracycline and $Cl^{36}$-labeled anhydrochlortetracycline, respectively, and also from the control fermentation mash, and saved for further testing. The remaining portion of the control fermentation mash and that to which nonradioactive anhydrochlortetracycline had been added were assayed fluorometrically for chlortetracycline content, with the following results:

|  | Mash assay for chlortetracycline, mcg./ml. |
|---|---|
| Control (no anhydrochlortetracycline added) | 310 |
| Test (8.75 mg. anhydrochlortetracycline added) | 460 |

The 150 mcg./ml. of chlortetracycline difference between the control value of 310 mcg./ml. and the test value of 460 mcg./ml. is the amount of chlortetracycline derived from the conversion of the anhydrochlortetracycline to chlortetracycline, a yield of 43 percent.

The 3.0 ml. portions of control, $C^{14}$-labeled anhydrochlortetracycline and $Cl^{36}$-labeled anhydrochlortetracycline 120-hour fermentation mashes were each diluted with 10 ml. of 0.2 N hydrochloric acid and the mycelium removed by filtration. The filtrate, in each instance, was extracted by shaking with 0.5 ml. parachlorophenol.

Ten microliters of each phenol phase were spotted on individual 1-inch wide by 22-inch long strips of Whatman No. 1 chromatograph paper which previously had been buffered by immersion in a solution of 0.3 M $NaH_2PO_4$ adjusted to pH 3.0 with phosphoric acid, then air dried. Subsequently the strips were subjected to descending development; using the organic phase of a n-butanol:0.3 M $NaH_2PO_4$::1:1 solvent system wherein the buffer is adjusted to pH 3.0 with phosphoric acid (system A).

Three 1-inch wide by 22-inch long strips of Whatman No. 1 chromatograph paper, which previously had been buffered by immersion in a solution composed of equal volumes of 0.4 M $Na_2HPO_4$ and 4.5 percent citric acid, were air dried. The buffered strips were hung overnight in a chromatograph tank containing water on the floor of the tank and ethyl acetate in an open container on the bottom of the tank. About an hour before developing, a 10-microliter volume of the phenol phase of the extract of control filtrate was spotted on one strip, an equal volume of the phenol phase of the extract of $C^{14}$-labeled test filtrate was spotted on a second strip, and an equal volume of the phenol phase of the extract of $Cl^{36}$-labeled test filtrate was spotted on a third strip. Subsequently, the strips were subjected to descending development; using the organic phase of an ethyl acetate:phosphate-citrate buffer::1:1 solvent system at pH 4.5 (system B). The phosphate-citrate buffer is composed of equal volumes of 0.4 M $Na_2HPO_4$ and 4.5 percent citric acid. Developed spots were detected by fuming the strips with ammonia and viewing under ultraviolet light.

The developed, air-dried strips were scanned for radioactivity by means of a Geiger-Müller counter. The appearance of zones of radioactivity on the test strips at $R_f$ 0.54 (system A) and at $R_f$ 0.76 (system B); corresponding to the $R_f$ values for chlortetracycline confirmed the conversion of anhydrochlortetracycline to chlortetracycline as previously demonstrated by the mash assay shown above. By measurement of radioactive peak areas, the extent of conversion of $C^{14}$-labeled anhydrochlortetracycline to $C^{14}$-labeled chlortetracycline was estimated at 50 percent; while the conversion of $Cl^{36}$-labeled anhydrochlortetracycline to $Cl^{36}$-labeled chlortetracycline was estimated at 40 percent.

EXAMPLE 5

*Conversion of 7-Bromoanhydrotetracycline to 7-Bromotetracycline*

Spores of *S. aureofaciens* ATCC No. 12,551 were washed from a streaked agar slant with sterile distilled water to form a suspension containing approximately 70×10⁶ spores per milliliter. A 100 ml. portion of the sterile inoculum medium in a 500-ml. Erlenmeyer flask was inoculated with a 1.0 ml. aliquot of this suspension and incubated at 26.5° C. on a reciprocating shaker operating at 116 oscillations per minute for 24 hours. At the termination of this incubation period, a 1.0 ml. portion of this inoculum was added to each of two 250-ml. Erlenmeyer flasks containing 25 ml. of the sterile fermentation medium plus 175 mcg. of 2-(2-furyl)-5-mercapto-1,3,4-oxadiazole, an inhibitor of fermentative chlorination. For a period of 48 hours these two inoculated flasks were incubated at 25° C. on a rotary shaker operating at 180 revolutions per minute; then 8.0 mg. of anhydrobromtetracycline was added, in powder form, to one of the two flasks. Both flasks were again incubated under the above conditions for 72 hours; making a total of 120 hours in all. The flasks were then removed from the incubator and their contents assayed for bromtetracycline, with the following results:

|  | Mash assay for bromtetracycline, mcg./ml. |
|---|---|
| Control (no anhydrobromtetracycline added) | 0 |
| Test (8.0 mg. of anhydrobromtetracycline added) | 180 |

The overall conversion of anhydrobromtetracycline to bromtetracycline was 56 percent.

EXAMPLE 6

*Conversion of 6-Demethylanhydrotetracycline to 6-Demethyltetracycline*

A water suspension, containing approximately 70×10⁶ spores per milliliter of *S. aureofaciens* ATCC No. 13,192 was produced by washing a streaked agar slant with sterile distilled water. One milliliter of this suspension was used to inoculate 100 ml. of the sterile inoculum medium in a 500-ml. Erlenmeyer flask. The seeded medium was incubated at 26.5° C. for 24 hours on a reciprocating shaker operating at 116 oscillations per minute. At the termination of this incubation period, two 25 ml. portions of the sterile fermentation medium in two 250-ml. Erlenmeyer flasks were seeded with 1.0 ml. aliquots of this 24-hour inoculum. These two seeded flasks were incubated at 25° C. for 48 hours on a rotary shaker operating at 180 revolutions per minute. Upon completion of this 48-hour incubation period, 3.0 ml. aliquots of both growing mashes were transferred to 20×150 mm. sterile shaker tubes. A 200 mcg. quantity of $C^{14}$-labeled 6-demethylanhydrotetracycline (1,000 disintegrations per minute per microgram) in powder form was added to one tube; the other being retained as a control. The tubes were mounted on a rotary shaker and incubated at 25° C. for an additional 72 hours; making a total incubation period of 120 hours. Upon completion of this incubation period, the tubes were removed, the mash in each diluted with 10 ml. of 0.2 N hydrochloric acid and the mycelium removed by filtration. Each filtrate was extracted by shaking with 0.5 ml. of parachlorophenol.

Two strips of 1-inch wide by 22-inch long Whatman No. 1 chromatograph paper were buffered by immersion in a pH 3.4 buffer solution composed of 30 volumes of 0.2 M $Na_2HPO_4$ and 70 volumes of 2.24 percent citric acid, and air dried. The two buffered strips were suspended in a chromatograph tank containing water on the floor of the tank and a mixture of organic solvents (nitromethane:benzene:pyridine::20:10:3) in an open container on the bottom of the tank. About an hour before developing, a 10 microliter quantity of the phenol phase of the extract of control filtrate was spotted on one strip and an equal volume of the phenol phase of the extract of $C^{14}$-labeled test filtrate was spotted on the other. Subsequently, the strips were subjected to descending development; utilizing the organic phase of a nitromethane:benzene:pyridine:pH 3.4 buffer::20:10:3:3 solvent system wherein the pH 3.4 buffer was composed of 30 volumes of 0.2 M $Na_2HPO_4$ and 70 volumes of 2.24 percent citric acid (system C).

Two strips of 1-inch wide by 22-inch long Whatman No. 1 chromatograph paper were buffered by immersion in a solution of 0.3 M $NaH_2PO_4$ adjusted to pH 2.0 with phosphoric acid, then air-dried. The two buffered strips were suspended in a chromatograph tank containing water on the floor of the tank and an organic solvent (butyl acetate) in an open container on the bottom of the tank. About an hour before developing, a 10 microliter quantity of the phenol phase of the extract of control filtrate was spotted on one strip, and an equal volume of the phenol phase of the extract of $C^{14}$-labeled test filtrate was spotted on the other. Subsequently, the strips were subjected to descending development; using the organic phase of a butyl acetate:5% trichloracetic acid: pH 2.0 buffer::5:1:4 solvent system wherein the buffer solution was 0.3 M $NaH_2PO_4$ (system D).

The developed, air-dried strips were examined visually and scanned for radioactivity by means of a Geiger-Müller counter. The appearance of zones of radioactivity having $R_f$ values of 0.33 (system C) and 0.24 (system D), corresponding to those of 6-demethyltetracycline, testified to the conversion of $C^{14}$-labeled 6-demethylanhydrotetracycline to $C^{14}$-labeled 6-demethyltetracycline. Measurement of radioactive peak areas indicated the extent of conversion of $C^{14}$-labeled 6-demethylanhydrotetracycline to $C^{14}$-labeled 6-demethyltetracycline to be 50 percent.

EXAMPLE 7

*Conversion of 6-Demethyl-7-Bromoanhydrotetracycline to 6-Demethyl-7-Bromotetracycline*

An aqueous suspension of *S. aureofaciens* ATCC No. 10,762 spores, containing approximately 70×10⁶ spores per milliliter, was prepared by washing a streaked agar slant with sterile distilled water. A 1.0 ml. quantity of this suspension was added to 100 ml. of the sterile inoculum medium in a 500-ml. Erlenmeyer flask. The inoculated material was incubated at 26.5° C. for 24 hours on a reciprocating shaker, then 1.0 ml. portions of this 24-hour inoculum were removed and added to each of two 25 ml. quantities of the sterile fermentation medium in two 250-ml. Erlenmeyer flasks. The flask contents were incubated at 25° C. for 48 hours on a rotary shaker, then 8.0 mg. of 7-bromo-6-demethylanhydrotetracycline was added, in powder form, to one of the two flasks. Both flasks were again incubated at 25° C. on a rotary shaker for an additional 72 hours; thus achieving a total incubation time at 25° C. of 120 hours. Assay of the 120-hour fermentation mashes from these two flasks yielded the following results:

Mash assay for 7-bromo-6-demethyltetracycline, mcg./ml.

Control (no 7-bromo-6-demethylanhydrotetracycline added) _____ 0
Test (8 mg. of 7-bromo-6-demethylanhydrotetracycline added) _____ 215

The overall conversion of 7-bromo-6-demethylanhydrotetracycline to 7-bromo-6-demethyltetracycline was 61 percent.

EXAMPLE 8

*Conversion of Anhydrotetracyclinonitrile to Tetracyclinonitrile*

A 500-ml. Erlenmeyer flask containing 100 ml. of the sterile inoculum medium was seeded with 1.0 ml. of an aqueous suspension of spores of *S. aureofaciens* ATCC No. 13,192. The concentration of spores in this suspension was approximately 65×10⁶. The seeded inoculum was incubated at 26.5° C. for 24 hours on a reciprocating shaker. At the end of this period, a 1.0 ml. aliquot of this inoculum was added to each of two 25 ml. portions of the sterile fermentation medium in separate 250-ml. Erlenmeyer flasks. These two seeded flasks were incubated at 25° C. on a rotary shaker for 48 hours. At this point, 7.0 mg. of powdered anhydrotetracyclinonitrile was added to one of the flasks; the other being retained as a control. Both flasks were again incubated at 25° C. and with agitation for 72 hours more; thus resulting in a total incubation time at 25° C. of 120 hours. Three milliliter aliquots of both test and control 120-hour fermentation mashes were each diluted with 10 ml. of 0.2 N hydrochloric acid and the mycelium removed by filtration. The filtrate, in each instance, was extracted by shaking with 0.5 ml. of parachlorophenol.

Four 1-inch wide by 22-inch long strips of Whatman No. 1 chromatograph paper were buffered by immersion in a solution of 0.3 M $NaH_2PO_4$ adjusted to pH 2.0 with phosphoric acid, then air dried. Two buffered strips were suspended overnight in a chromatograph tank containing water on the floor of the tank and a mixture of organic solvents (chloroform:amyl alcohol::4:1) in an open container on the bottom of the tank. About an hour before developing, a 10 microliter quantity of the phenol phase of the extract of control filtrate was spotted on one strip and an equal volume of the phenol phase of the extract of test filtrate was spotted on the other. Subsequently, the two strips were subjected to descending development; utilizing the organic phase of a chloroform:amyl alcohol:pH 2.0 buffer::4:1:5 solvent system wherein the pH 2.0 buffer solution was 0.3 M $NaH_2PO_4$ (system E). The other two buffered strips were suspended overnight in a chromatograph tank containing water on the floor of the tank and a mixture of organic solvents (chloroform:dimethylformamide::4:1) in an open container on the bottom of the tank. About an hour before development, a 10-microliter quantity of the phenol phase of the extract of control filtrate was spotted on one buffered strip and an equal volume of the phenol phase of the extract of test filtrate was spotted on the other. Subsequently, the two strips were subjected to descending development using the organic phase of a chloroform:dimethylformamide:pH 2.0 buffer::4:1:6 solvent system wherein the pH 2.0 buffer solution was 0.3 M $NaH_2PO_4$ (system F). The developed air-dried strips were scanned fluoroscopically. The appearance of fluorescent zones having $R_f$ values of 0.14 (system E) and 0.12 (system F), corresponding to those of tetracyclinonitrile, thus confirmed the fact that anhydrotetracyclinonitrile was converted to tetracyclinonitrile. The extent of conversion of anhydrotetracyclinonitrile to tetracyclinonitrile was estimated at 35 percent.

What is claimed is:

1. The process for the biological transformation of an anhydrotetracycline to the corresponding tetracycline which comprises adding an anhydrotetracycline to an aqueous nutrient medium, aerobically fermenting the aqueous nutrient medium with a strain of a species of the genus Streptomyces selected from the group consisting of *S. aureofaciens*, *S. rimosus* and *S. viridifaciens*, and continuing the fermentation until the anhydrotetracycline is substantially converted to the corresponding tetracycline.

2. The process for the biological transformation of anhydrotetracycline to tetracycline which comprises adding anhydrotetracycline to an aqueous nutrient medium, aerobically fermenting the aqueous nutrient medium with a strain of a species of the genus Streptomyces selected from the group consisting of *S. aureofaciens*, *S. rimosus* and *S. viridifaciens*, and continuing the fermentation until the anhydrotetracycline is substantially converted to tetracycline.

3. The process for the biological transformation of 7-chloroanhydrotetracycline to 7-chlorotetracycline which comprises adding 7-chloroanhydrotetracycline to an aqueous nutrient medium, aerobically fermenting the aqueous nutrient medium with a strain of a species of the genus Streptomyces selected from the group consisting of *S. aureofaciens*, *S. rimosus* and *S. viridifaciens*, and continuing the fermentation until the 7-chloroanhydrotetracycline is substantially converted to 7-chlorotetracycline.

4. The process for the biological transformation of 7-bromoanhydrotetracycline to 7-bromotetracycline which comprises adding 7-bromoanhydrotetracycline to an aqueous nutrient medium, aerobically fermenting the aqueous nutrient medium with a strain of a species of the genus Streptomyces selected from the group consisting of *S. aureofaciens*, *S. rimosus* and *S. viridifaciens*, and continuing the fermentation until the 7-bromoanhydrotetracycline is substantially converted to 7-bromotetracycline.

5. The process for the biological transformation of 6-demethylanhydrotetracycline to 6-demethyltetracycline which comprises adding 6-demethylanhydrotetracycline to an aqueous nutrient medium, aerobically fermenting the aqueous nutrient medium with a strain of a species of the genus Streptomyces selected from the group consisting of *S. aureofaciens*, *S. rimosus* and *S. viridifaciens*, and continuing the fermentation until the 6-demethylanhydrotetracycline is substantially converted to 6-demethyltetracycline.

6. The process for the biological transformation of 6-demethyl-7-chloroanhydrotetracycline to 6-demethyl-7-chlorotetracycline which comprises adding 6-demethyl-7-chloroanhydrotetracycline to an aqueous nutrient medium, aerobically fermenting the aqueous nutrient medium with a strain of a species of the genus Streptomyces selected from the group consisting of *S. aureofaciens*, *S. rimosus* and *S. viridifaciens*, and continuing the fermentation until the 6-demethyl-7-chloroanhydrotetracycline is substantially converted to 6-demethyl-7-chlorotetracycline.

7. The process for the biological transformation of 6-demethyl-7-bromoanhydrotetracycline to 6-demethyl-7-bromotetracycline which comprises adding 6-demethyl-7-bromoanhydrotetracycline to an aqueous nutrient medium, aerobically fermenting the aqueous nutrient medium with a strain of a species of the genus Streptomyces selected from the group consisting of *S. aureofaciens*, *S. rimosus* and *S. viridifaciens*, and continuing the fermentation until the 6-demethyl-7-bromoanhydrotetracycline is substantially converted to 6-demethyl-7-bromotetracycline.

8. The process for the biological transformation of anhydrotetracyclinonitrile to tetracyclinonitrile which comprises adding anhydrotetracyclinonitrile to an aqueous nutrient medium, aerobically fermenting the aqueous nutrient medium with a strain of a species of the genus Streptomyces selected from the group consisting of *S. aureofaciens*, *S. rimosus* and *S. viridifaciens*, and continuing the fermentation until the anhydrotetracyclinonitrile is substantially converted to tetracyclinonitrile.

9. The process for the biological transformation of 12a-deoxyanhydrotetracycline to 12a-deoxytetracycline which comprises adding 12a-deoxyanhydrotetracycline to an aqueous nutrient medium, aerobically fermenting the aqueous nutrient medium with a strain of the species of the genus Streptomyces selected from the group consisting of *S. aureofaciens*, *S. rimosus* and *S. viridifaciens*, and continuing the fermentation until the 12a-deoxyanhydrotetracycline is substantially converted to 12a-deoxytetracycline.

References Cited in the file of this patent

UNITED STATES PATENTS

| | | |
|---|---|---|
| 2,952,587 | Miller et al. | Sept. 13, 1960 |
| 2,965,546 | McCormick et al. | Dec. 20, 1960 |